US011379088B2

(12) United States Patent
Xie et al.

(10) Patent No.: US 11,379,088 B2
(45) Date of Patent: Jul. 5, 2022

(54) METAL MESH ASSEMBLY, TOUCH CONTROL DISPLAY PANEL AND MANUFACTURING THEREOF, AND DISPLAY APPARATUS

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Xiaodong Xie, Beijing (CN); Min He, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 633 days.

(21) Appl. No.: 16/344,648

(22) PCT Filed: Nov. 22, 2018

(86) PCT No.: PCT/CN2018/116945
§ 371 (c)(1),
(2) Date: Apr. 24, 2019

(87) PCT Pub. No.: WO2019/205609
PCT Pub. Date: Oct. 31, 2019

(65) Prior Publication Data
US 2021/0365137 A1 Nov. 25, 2021

(30) Foreign Application Priority Data
Apr. 28, 2018 (CN) .......................... 201810401771.X

(51) Int. Cl.
*G06F 3/041* (2006.01)
*G06F 3/047* (2006.01)

(52) U.S. Cl.
CPC .......... *G06F 3/047* (2013.01); *G06F 3/04164* (2019.05)

(58) Field of Classification Search
None
See application file for complete search history.

(56) References Cited

U.S. PATENT DOCUMENTS

2014/0362029 A1* 12/2014 Mo ...................... G06F 3/0445
345/174
2015/0109231 A1* 4/2015 Shirai ................... G06F 3/0448
345/173

(Continued)

FOREIGN PATENT DOCUMENTS

CN 106201145 A 12/2016
CN 107765917 A 3/2018

(Continued)

OTHER PUBLICATIONS

Korea First Office Action in Application No. 10-2019-7026514, dated Mar. 12, 2021.

(Continued)

*Primary Examiner* — Krishna P Neupane
(74) *Attorney, Agent, or Firm* — Syncoda LLC; Feng Ma

(57) ABSTRACT

A metal mesh assembly includes a plurality of composite pattern units, each formed by metal lines and having two substantially perpendicular symmetric axes. The metal lines include driving lines in a driving layer and sensing lines in a sensing layer insulated from the driving layer. The driving lines and the sensing lines each have a pattern with the two substantially perpendicular symmetric axes, and compositely form each composite pattern unit. Optionally, the metal lines further include dummy lines, arranged in at least one (Continued)

of a dummy layer, the driving layer or the sensing layer, which can also participate in the formation of each composite pattern unit, and the dummy lines can also have a pattern with the two substantially perpendicular symmetric axes.

18 Claims, 11 Drawing Sheets

(56) References Cited

U.S. PATENT DOCUMENTS

| | | | |
|---|---|---|---|
| 2015/0212537 A1* | 7/2015 | Cok | G06F 3/042 345/174 |
| 2015/0355752 A1 | 12/2015 | Kurasawa et al. | |
| 2016/0103520 A1 | 4/2016 | Kim et al. | |
| 2016/0282973 A1 | 9/2016 | Kholodenko et al. | |
| 2017/0090634 A1* | 3/2017 | Yang | G06F 3/0445 |
| 2019/0146605 A1 | 5/2019 | Xu et al. | |
| 2019/0346971 A1* | 11/2019 | Ikeda | G06F 3/0446 |

FOREIGN PATENT DOCUMENTS

| | | |
|---|---|---|
| CN | 107831957 A | 3/2018 |
| JP | 2013020560 A | 1/2013 |
| KR | 20160007627 A | 1/2016 |
| KR | 20160043585 A | 4/2016 |

OTHER PUBLICATIONS

Korea Second Office Action in Application No. 10-2019-7026514, dated May 21, 2021.
International Search Report in Application No. PCT/CN2018/116945, dated Feb. 22, 2019.
CN First Office Action in Application No. 201810401771.X, dated Dec. 25, 2019.
Extended European Search Report in Application No. 18905899.3, dated Dec. 3, 2021.

* cited by examiner

METAL MESH ASSEMBLY, TOUCH CONTROL DISPLAY PANEL AND MANUFACTURING THEREOF, AND DISPLAY APPARATUS

CROSS-REFERENCE TO RELATED APPLICATION

The present application claims priority to Chinese Patent Application No. 201810401771.X filed on Apr. 28, 2018, the disclosure of which is hereby incorporated by reference in its entirety.

TECHNICAL FIELD

The present disclosure relates generally to the field of display technologies, and more specifically to a metal mesh assembly, a touch control display panel and its manufacturing method, and a display panel containing the touch control display panel.

BACKGROUND

Touch control display panel (or touch panel) is a system realizing the functionality of positioning by calculating the coordinates of the touch points within the display screen or display panel. It substantially comprises a touch detection portion and a touch controller.

The touch detection portion is typically arranged on a front side of the touch control display panel, which detects the position where a user touches the display panel/screen and then sends the detection signal corresponding to the touch position to the touch controller.

The touch controller converts the detection signal that has been received from the touch detection portion into coordinate data, and then transmits the coordinate data to a central processing unit. Furthermore, the touch controller can also receive a control signal returned by the central processing unit, and then can execute based on the control signal to thereby realize a human-machine interaction.

In current touch control display panels, the N-type oxide semiconductor materials, such as indium tin oxide (ITO), have been extensively employed due to their excellent optical and electrical properties. Yet because of the rarity of the element indium (In), the manufacturing cost of the touch control display panels employing indium is expected to rise over the future.

As such, people have begun to look for new materials, with optical and electrical properties thereof comparable to the current ITO materials, to thereby replace the ITO materials. Under this situation, a metal mesh touch control display panel is emerging, which notably employs common metal materials, such as aluminum, copper, and silver, etc. In current touch control display panel industry, the metal mesh touch control display panels have become one of the most popular solutions, and the metal mesh touch control display panels have characteristics such as a high touch control accuracy, and a high touch control sensitivity.

In current metal mesh based touch control technologies, many metal mesh touch control display panels require a touch control support for an active pen, such as the active pen support tilt function. However, current metal mesh touch control display panels do not meet these above needs. In addition, the optical effect of a typical metal mesh touch control display panel is mediocre.

SUMMARY

In a first aspect, the present disclosure provides a metal mesh assembly, which can be employed in a touch control display panel.

The metal mesh assembly includes a plurality of composite pattern units. Each of the plurality of composite pattern units is formed by a plurality of metal lines, and has two substantially perpendicular symmetric axes. The plurality of metal lines comprise a plurality of driving lines and a plurality of sensing lines. The plurality of driving lines are arranged in a driving layer, and the plurality of sensing lines are arranged in a sensing layer that is insulated from the driving layer.

The metal mesh assembly is further configured such that the plurality of driving lines and the plurality of sensing lines compositely form each of the plurality of composite pattern units, and each of the plurality of driving lines and the plurality of sensing lines have a pattern with the two substantially perpendicular symmetric axes.

Herein and throughout the disclosure, the terms "composite", "compositely", or alike, are referred to as a combination of an orthographic projection of each element on a same plane into a collective pattern on the same pattern. For example, the sentence that "the plurality of driving lines and the plurality of sensing lines compositely form each of the plurality of composite pattern units" substantially describes that an orthographic projection of the plurality of driving lines on a same plane (such as on a surface of a substrate that is in parallel with driving layer) and an orthographic projection of the plurality of sensing lines on the same plane collectively forms each of the plurality of composite pattern units (i.e. a pattern) on the same plane.

Optionally, in the metal mesh assembly described above, the plurality of metal lines for each of the plurality of composite pattern units can further comprise a plurality of dummy lines, which are arranged in at least one of a dummy layer, the driving layer or the sensing layer.

In other words, the plurality of dummy lines can be disposed in only one of the above mentioned three layers (i.e. the dummy layer, the driving layer, and the sensing layer). Alternatively, the plurality of dummy lines can be disposed in two of the above mentioned three layers (e.g. the dummy layer and the driving layer, the dummy layer and the sensing layer, or the driving layer and the sensing layer). Further alternatively, the plurality of dummy lines can be disposed in each of the above mentioned three layers (i.e. the dummy layer, the driving layer, and the sensing layer).

Herein, the metal mesh assembly is further configured such that the plurality of dummy lines, along with the plurality of driving lines and the plurality of sensing lines, compositely form each of the plurality of composite pattern units, and that the plurality of dummy lines have a pattern with the two substantially perpendicular symmetric axes.

According to some embodiments, each of the plurality of composite pattern units comprises a plurality of basic patterns. Each of the plurality of basic patterns is within a rectangular region and comprises a metal frame having a diamond shape and two metal segments crossing with each other. Herein each metal segment can run through a center of the diamond shape, and through two midpoints of two opposing sides of the diamond shape. It is further configured such that four corner points of the diamond shape are respectively at four midpoints of four sides of the rectangular region, and that the two metal segments are respectively two cross lines of the rectangular region.

According to some embodiments, at least some of the plurality of dummy lines are in the sensing layer, and each of the at least some of the plurality of dummy lines is severed from any of the plurality of sensing lines crossing therewith.

In the metal mesh assembly described above, the plurality of basic patterns can optionally be arranged in a matrix having an odd number of columns, wherein in each of the plurality of basic patterns, the metal frame is formed by a type of dummy lines, or by the type of dummy lines and a type of sensing lines compositely; and the two metal segments are formed by at least two of the type of dummy lines, the type of sensing lines, and a type of driving lines.

Herein optionally, a metal pattern in the sensing layer in the each of plurality of composite pattern units can be separated into four sub-sensing regions by the two substantially perpendicular symmetric axes, and each of the four sub-sensing can comprise a plurality of first composite patterns, which are sequentially connected one after another along one of the two substantially perpendicular symmetric axes.

Further optionally, each of the plurality first composite patterns can comprise a y-shaped portion and a λ-shaped portion, wherein an upper end part of the λ-shaped portion connects a lower end part of the y-shaped portion.

According to some embodiments of the metal mesh assembly, a metal pattern in the driving layer in the each of plurality of composite pattern units is separated into four sub-driving regions by the two substantially perpendicular symmetric axes, and each of the four sub-driving comprises a plurality of second composite patterns, sequentially connected one after another along one of the two substantially perpendicular symmetric axes.

Herein optionally, each of the plurality of second composite patterns can comprise an x-shaped portion having two crossing segments and two bent portions at a side of the x-shaped portion closer to the one of the two substantially perpendicular symmetric axes and connecting the two crossing segments respectively. The two bent portions can be parallel to the two crossing segments respectively.

According to some embodiments of the metal mesh assembly, the plurality of basic patterns are arranged in a matrix having an even number of columns. In each of the plurality of basic patterns, the metal frame is formed by a type of dummy lines, and the two metal segments are formed by any two of the type of dummy lines, the type of sensing lines, and a type of driving lines.

Herein optionally, a pattern for the plurality of driving lines in the each of plurality of composite pattern units can comprise a plurality of first diamond-shaped sub-patterns arranged in a matrix and sequentially connected one another along each of the two substantially perpendicular symmetric axes, and a column number of the plurality of first diamond-shaped sub-patterns can be an odd number.

Optionally, a pattern for the plurality of sensing lines in the each of plurality of composite pattern units can comprise a plurality of second diamond-shaped sub-patterns arranged in a matrix and sequentially connected one another along each of the two substantially perpendicular symmetric axes, and a column number of the plurality of second diamond-shaped sub-patterns can be an even number.

In any one embodiment of the metal mesh assembly described above, the metal mesh assembly can further comprise a first protection layer, which can be arranged between, and configured to provide insulation between, the driving layer and the sensing layer.

In a second aspect, the present disclosure further provides a touch control display panel, which can comprise a metal mesh assembly according to any one of the embodiments as described above.

According to some embodiments of the touch control display panel, the metal mesh assembly is arranged such that the sensing layer is closer to a touch side of the touch control display panel than the driving layer.

Optionally, the touch control display panel can further comprise a display panel, and the metal mesh assembly is arranged between the display panel and the touch side of the touch control display panel.

Further optionally, the touch control display panel can further comprise a black matrix layer, which is arranged at a substantially same layer as the sensing layer of the metal mesh assembly.

According to some embodiments of the touch control display panel, the metal mesh assembly further comprises a second protection layer, which is arranged between the driving layer and the display panel.

According to some embodiments, the touch control display panel further comprises a display panel, and the metal mesh is arranged between a color filter substrate and a POL layer of the display panel.

Herein optionally, the metal mesh assembly can further comprise a second protection layer, which is between the sensing layer and the POL layer of the display panel.

In a third aspect, the present disclosure further provides a display apparatus, which comprises a touch control display panel according to any one of the embodiments as described above.

Other embodiments may become apparent in view of the following descriptions and the attached drawings.

BRIEF DESCRIPTION OF THE DRAWINGS

To more clearly illustrate some of the embodiments, the following is a brief description of the drawings. The drawings in the following descriptions are only illustrative of some embodiments. For those of ordinary skill in the art, other drawings of other embodiments can become apparent based on these drawings.

DETAILED DESCRIPTION

In the following, with reference to the drawings of various embodiments disclosed herein, the technical solutions of the embodiments of the disclosure will be described in a clear and fully understandable way.

It is obvious that the described embodiments are merely a portion but not all of the embodiments of the disclosure. Based on the described embodiments of the disclosure, those ordinarily skilled in the art can obtain other embodiment(s), which come(s) within the scope sought for protection by the disclosure.

In a first aspect, the present disclosure provides a metal mesh assembly, which can be employed in touch control display panel to thereby realize a touch control, especially for an accompanying active pen with a tilt function.

The metal mesh assembly comprises a plurality of composite pattern units. Each of the plurality of composite pattern units is formed by a plurality of metal lines and is further configured to have two substantially perpendicular symmetric axes.

Herein, the plurality of metal lines include a plurality of driving lines, which are arranged in a driving layer; a plurality of sensing lines, which are arranged in a sensing layer; and a plurality of dummy lines, which are arranged in the driving layer only, in the sensing layer only, or in both the driving layer and the sensing layer (i.e. some dummy lines are in the driving layer, and others in the sensing layer). The insulation layer is electrically insulated from the driving layer, which can be realized, for example, by providing a first protection layer (substantially an insulation layer).

It is configured such that the plurality of driving lines, the plurality of sensing lines, and the plurality of dummy lines compositely form each of the plurality of composite pattern units; and each of the plurality of driving lines, the plurality of sensing lines, and the plurality of dummy lines have a pattern with the two substantially perpendicular symmetric axes.

Figure 1:
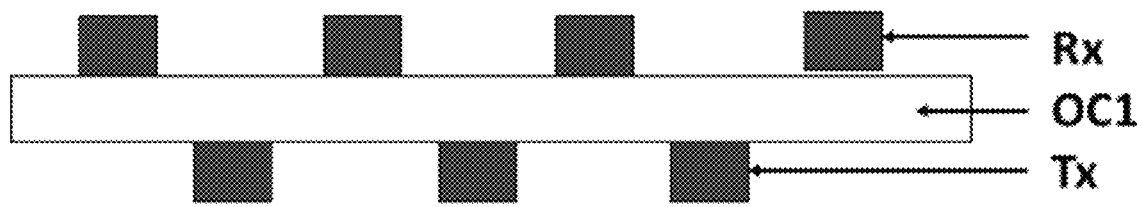
FIG. 1 shows a cross view of a metal mesh assembly according to one embodiment of the disclosure.

FIG. 1 illustrates a cross-sectional view of a metal mesh assembly according to some embodiments of the disclosure.

As shown in the figure, the metal mesh assembly comprises a driving layer (shown as Tx), a sensing layer (shown as Rx), and an insulation layer (or called first protection layer OC1) between the driving layer and the sensing layer. The driving layer has a first metal mesh pattern, and the sensing as a second metal mesh pattern.

Specifically, the first metal mesh pattern comprises a plurality of driving lines, and may optionally comprise dummy lines. The second metal mesh pattern comprises a plurality of sensing lines, and may optionally comprise dummy lines. In other words, all of the plurality of driving lines are in the driving layer Tx, all of the plurality of sensing lines are in the sensing layer Rx, and the plurality of dummy lines can optionally be wholly arranged in the driving layer Tx, wholly arranged in the sensing layer Rx, or partly in the driving layer Tx and partly in the sensing layer Rx.

Figure 2:
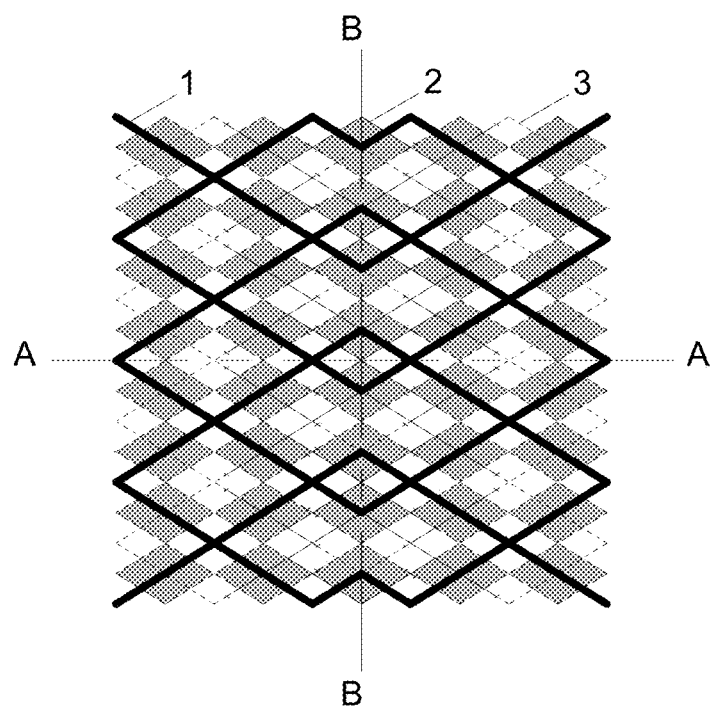
FIG. 2 shows a composite pattern unit of a metal mesh assembly according to the one embodiment of the disclosure.
Figure 11:
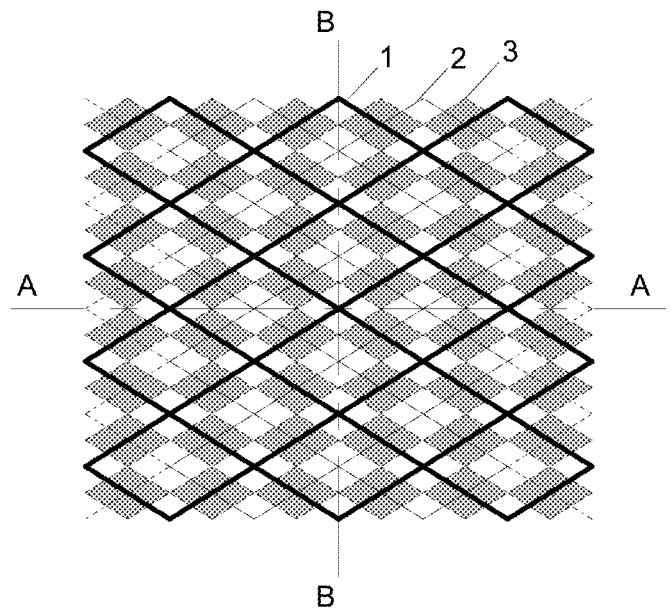
FIG. 11 shows a composite pattern unit of a metal mesh assembly according to another embodiment of the disclosure.

The composite pattern formed by the plurality of driving lines, the plurality of sensing lines, and the plurality of dummy lines can be seen by one embodiment shown in FIG. 2 and another embodiment shown in FIG. 11. Both FIG. 2 and FIG. 11 substantially illustrate a top view of the metal lines in the metal mesh assembly.

FIGS. 2-10 illustrate a metal mesh assembly according to one embodiments of the disclosure. FIGS. 11-16 illustrate a metal mesh assembly according to another embodiments of the disclosure.

As shown in FIG. 2, the metal mesh assembly includes a plurality of composite pattern units which are formed by a plurality of metal lines. Each of the plurality of composite pattern units has a first symmetric axis A-A and a second symmetric axis B-B that are substantially perpendicular to each other. Each of the plurality of composite pattern units comprises a plurality of basic patterns.

As such, each of the plurality of composite pattern units and the metal mesh assembly has substantially complete symmetry, which can effectively improve the performance of an active pen that accompanies the touch control display panel. In addition, the metal mesh assembly with complete symmetry also has good optical characteristics, which can effectively improve the optical effect of the metal mesh touch control display panel.

Figure 3:
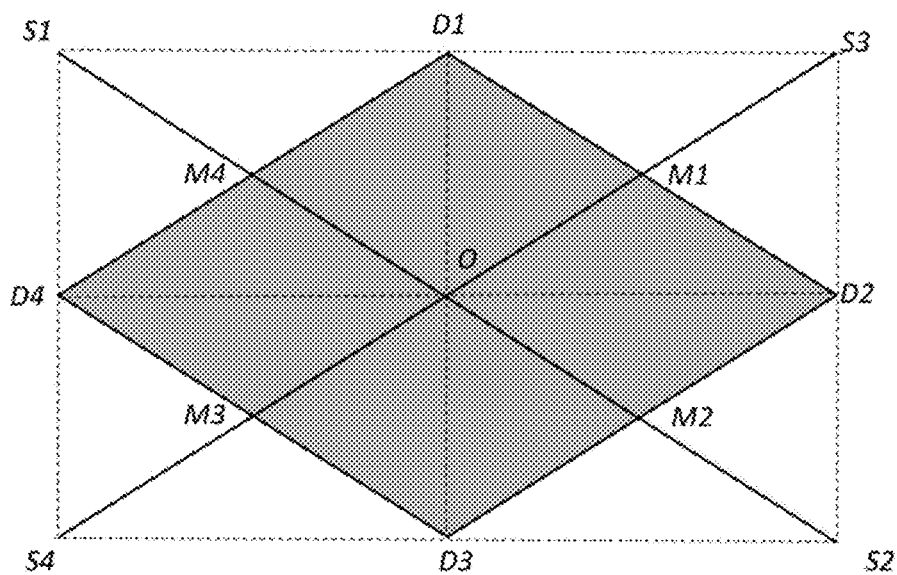
FIG. 3 shows a basic pattern of the composite pattern unit of the metal mesh assembly according to the one embodiment of the present disclosure.

FIG. 3 illustrates a structure of a basic pattern in each of the plurality of composite pattern units according to some embodiments of the disclosure. Each of the plurality of basic patterns can be the basic pattern shown in the figure. As illustrated, the basic pattern comprises a metal frame having a diamond shape (i.e. diamond-shaped metal frame) and two metal segments crossing with each other.

The diamond-shaped metal frame has four corner points D1, D2, D3, and D4. Each of the two metal segments and is configured to run through a center point O of the diamond-shaped metal frame and further through the midpoints of two opposing sides of the diamond-shaped metal frame. For example, one metal segment S1S2 runs through the midpoint M2, the center point O, and the midpoint M4; and the other metal segment S3S4 runs through the midpoint M1, the center point O, and the midpoint M3.

Specifically, the basic patterns can be arranged to be within a rectangular region, as specifically shown in FIG. 3. In other words, the diamond-shaped metal frame is configured to have each of its four corner points (i.e. D1, D2, D3, and D4) and each of two end points (i.e. S1 and S2, S3 and S4) of each of the two metal segments fall onto the margin of the rectangular region (shown by the largest rectangle with dotted lines). Each of the two metal segments is substantially a diagonal line for the rectangular region. The four corner points (i.e. D1, D2, D3, and D4) of the diamond-shaped metal frame are respectively located at the midpoints of the four sides of the rectangular region.

As further illustrated in FIG. 2, the composite pattern unit comprises a plurality of driving lines 1 arranged in a driving layer, a plurality of sensing lines 2 arranged in a sensing layer, and a plurality of dummy lines 3 arranged in the sensing layer, which compositely form the composite pattern unit.

It is noted that in this above embodiment, the plurality of dummy lines 3 are arranged in the sensing layer, but according to other embodiments, the plurality of dummy lines 3 can alternatively be arranged in the driving layer, or can be partly arranged in the sensing layer, and partly arranged in the driving layer. The specific design for the plurality of dummy lines 3 can be selected based on practical needs.

As further illustrated in FIG. 2, the composite pattern unit includes an odd number of columns of basic patterns, which specifically has 8 rows and 5 columns.

With further reference to FIG. 2 and FIG. 3, in order to clearly illustrated the structure of the composite pattern unit described above, the diamond-shaped metal meshes in the basic pattern are all filled with gray color.

Specifically in the basic patterns in the embodiments of the metal mesh assembly described above, the diamond-shaped metal frames are formed by dummy lines 3 only, or alternatively are formed by the dummy lines 3 and the sensing lines 2 in a composite manner (i.e. together). In one example, the four sides of some diamond-shaped metal frame are formed all by the dummy lines 3, whereas the four sides of other diamond-shaped metal frame are formed together by dummy lines 3 and sensing lines 2.

Furthermore, the two metal segments are formed by any two or all three of the dummy lines 3, the sensing lines 2, and the driving lines 1. For example, for some basic patterns, the two metal segments are formed by dummy lines 3 and sensing lines 2, by dummy lines and driving lines 1, or by sensing lines and driving lines 1. For some other basic patterns, the two metal segments are formed by dummy lines 3, sensing lines 2, and driving lines 1.

In the following, the pattern for the driving lines 1, the pattern for the sensing lines 2, and the pattern for the dummy lines 3 are described in detail individually.

Figure 4:
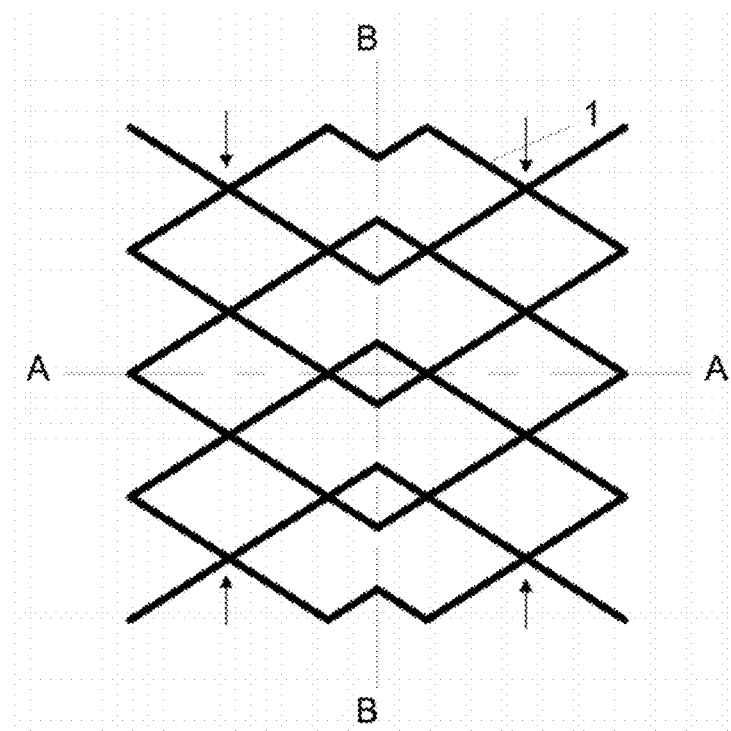
FIG. 4 illustrates a pattern for the driving lines in the metal mesh assembly according to the one embodiment of the present disclosure.

FIG. 4 illustrates a pattern for the driving lines 1 in the metal mesh assembly according to the above embodiment of the present disclosure. As shown in the figure, the pattern for the driving lines 1, which are in the driving layer, has two symmetric axes that substantially overlap with the first symmetric axis A-A and the second symmetric axis B-B, respectively. Such a configuration for the pattern for the driving lines 1 allows the composite pattern unit to have a substantially complete symmetry.

As further illustrated in FIG. 4, the driving layer substantially comprises four sub-driving region patterns which are separated by the first symmetric axis A-A and the second symmetric axis B-B. These four sub-driving region patterns include a sub-driving region pattern on the upper left, a sub-driving region pattern on the lower left, a sub-driving region pattern on the upper right, and a sub-driving region pattern on the lower right. Any two adjacent sub-driving region patterns are symmetrical along a symmetric axis (i.e. the first symmetric axis A-A or the second symmetric axis B-B) between the two adjacent sub-driving region patterns.

In the following, the sub-driving region pattern on the upper right is described below in detail for better illustration.

As illustrated in FIG. 4, the sub-driving region pattern in the driving layer described above include a plurality of second composite patterns, which are arranged one after another and sequentially connected along the second symmetric axis B-B.

Figure 5:
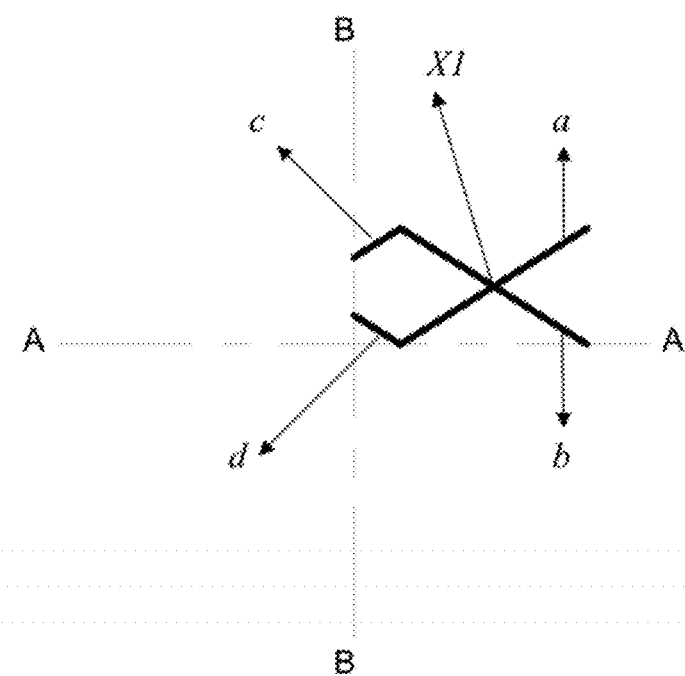
FIG. 5 illustrates a second composite pattern according to the one embodiment of the present disclosure.

FIG. 5 illustrates one of the plurality of second composite patterns shown in FIG. 4. As shown in FIG. 5, the second composite pattern comprises an x-shaped portion, and the end part of each of the two crossing segments of the x-shaped portion that is close to the second symmetric axis B-B is provided with a bent portion, which is parallel to one of the two lines of the x-shaped portion that crosses with the each of the two lines of the x-shaped portion.

In the embodiments shown in FIG. 4 and FIG. 5, the x-shaped portion comprises two crossing segments (i.e. a first segment a and a second segment b) with equal length, and the crossing point X1 between the two crossing segments a and b is a midpoint for each of the two crossing segments. The bent portion c connecting the end part of the first segment a that is close to the second symmetric axis B-B is parallel to the second segment b, and the bent portion d connecting the end part of the first segment b that is close to the second symmetric axis B-B is parallel to the second segment a. The two bent portions c and d have their respective end part falling on the second symmetric axis B-B.

As further illustrated in FIG. 4 and FIG. 5, the x-shaped portions at a same side (i.e. left side or right side) of the second symmetric axis B-B can form relatively bigger diamonds. In addition, the topmost diamond has an outside angle that is internally concave, as illustrated by the two top-to-bottom arrows in FIG. 4. The bottommost diamond has an outside angle that is also internally concave, as illustrated by the two bottom-to-top arrows in FIG. 4.

Figure 6:
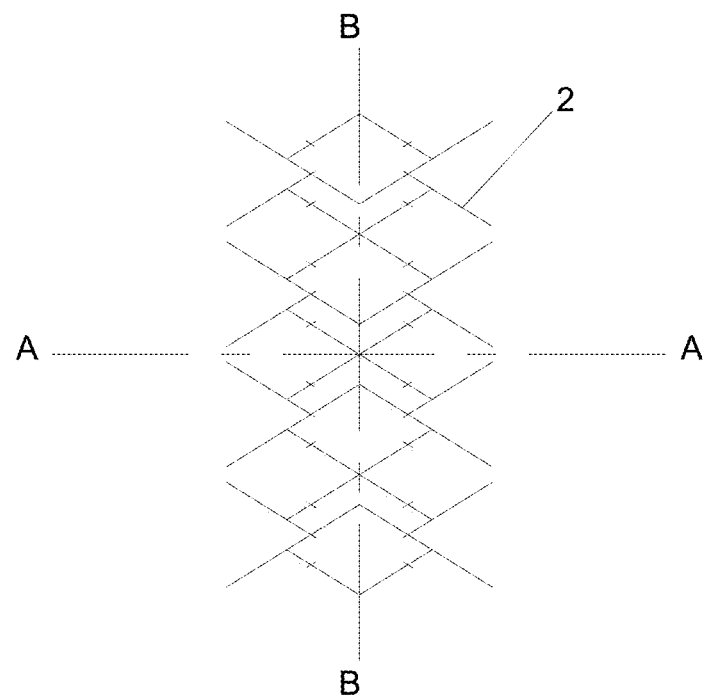
FIG. 6 illustrates a pattern for the sensing lines in the sensing layer of the metal mesh assembly according to the one embodiment of the present disclosure.

FIG. 6 illustrates a pattern for the sensing lines 2 in the sensing layer of the metal mesh assembly according to the above embodiments of the present disclosure. As shown in the figure, the pattern for the sensing lines 2 also has two symmetric axes that substantially overlap with the above mentioned first symmetric axis A-A and the second symmetric axis B-B, respectively. Such a configuration for the pattern for the sensing lines 2 allows the composite pattern unit to have a substantially complete symmetry.

As further illustrated in FIG. 6, the sensing layer substantially comprises four sub-sensing region patterns which are separated by the first symmetric axis A-A and the second symmetric axis B-B. These four sub-sensing region patterns include a sub-sensing region pattern on the upper left, a sub-sensing region pattern on the lower left, a sub-sensing region pattern on the upper right, and a sub-sensing region pattern on the lower right. Any two adjacent sub-sensing region patterns are symmetrical along a symmetric axis (i.e. the first symmetric axis A-A or the second symmetric axis B-B) between the two adjacent sub-sensing region patterns.

In the following, the sub-sensing region pattern on the upper right is described below in detail for better illustration.

As illustrated in FIG. 6, the sub-sensing region pattern in the sensing layer described above includes a plurality of first composite patterns, arranged one after another and sequentially connected along the second symmetric axis B-B.

Figure 7:
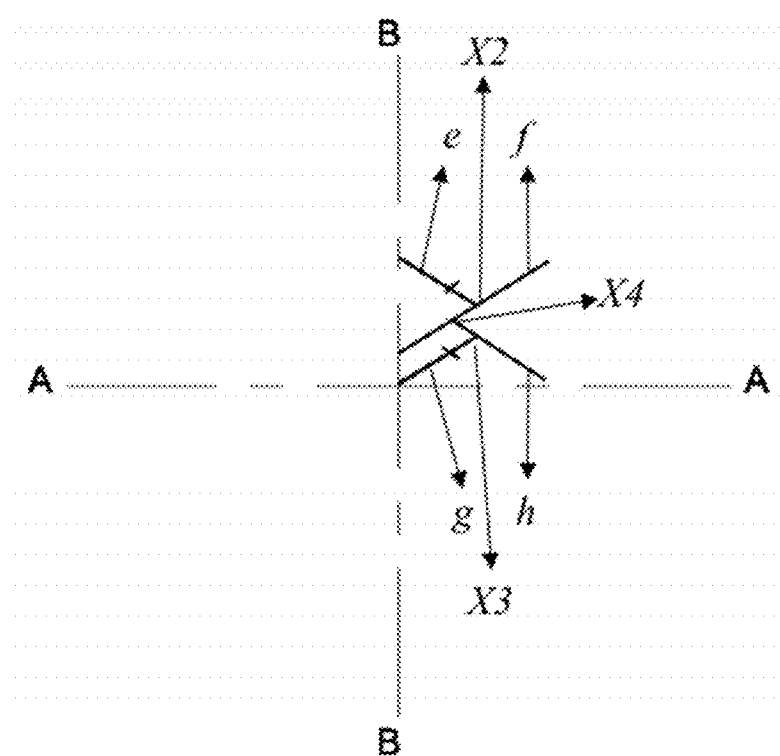
FIG. 7 illustrates a first composite pattern according to the one embodiment of the present disclosure.

FIG. 7 illustrates one of the plurality of first composite patterns shown in FIG. 6. As shown in FIG. 7, each of the plurality of first composite patterns comprises a y-shaped portion and a λ-shaped portion, and an upper end part of the λ-shaped portion connects a lower end part of the y-shaped portion. In other words, the y-shaped portion is arranged at an upper part, and the λ-shaped portion is arranged at a lower part in the sub-sensing region pattern on the upper right.

In the embodiment of the metal mesh assembly described above, the y-shaped portion comprises two segments that are arranged to have an angle therebetween (i.e. a third segment e and a fourth segment f). The third segment e has a length that is shorter than that of the fourth segment f. The third segment e constitutes the upper left part of the y-shaped portion, and the fourth segment f constitutes the rest of the y-shaped portion. In other words, the third segment e connects a midpoint (i.e. connecting point X2) of the fourth segment f.

In the embodiment of the metal mesh assembly described above, the λ-shaped portion also comprises two segments that are arranged to have an angle therebetween (i.e. a fifth segment g and a sixth segment h). The fifth segment g has a length that is shorter than that of the sixth segment h. The fifth segment g constitutes the lower left part of the y-shaped portion, and the sixth segment h constitutes the rest of the y-shaped portion. In other words, the fifth segment g connects a midpoint (i.e. connecting point X3) of the sixth segment h.

Furthermore, in the first composite pattern illustrated in FIG. 6 and FIG. 7, the upper end of the sixth segment h in the λ-shaped portion connects a point X4 in the fourth segment f in the y-shaped portion, and the connecting point X4 is positionally arranged at a lower part of the fourth segment f, such as at a position relatively lower than the connecting point X2 of the third segment e and the fourth segment f, as illustrated in FIG. 7.

With further reference to FIG. 6 and FIG. 7, the y-shaped portions at the two sides (i.e. the left side and the right side) of the second symmetric axis B-B can together form shapes of diamonds.

It should be noted that in FIG. 6, each of the short segments illustrates a connecting position or a crossover position between a sensing line 2 and a dummy line 3. Preferably, such a connecting/crossover position undergoes a severing treatment to completely separate the sensing layer from the dummy region, which can in turn ensure a relatively good shadow elimination effect, which can effectively modulate the shadow elimination and the Moire pattern for the metal mesh touch control display panels.

Figure 8:
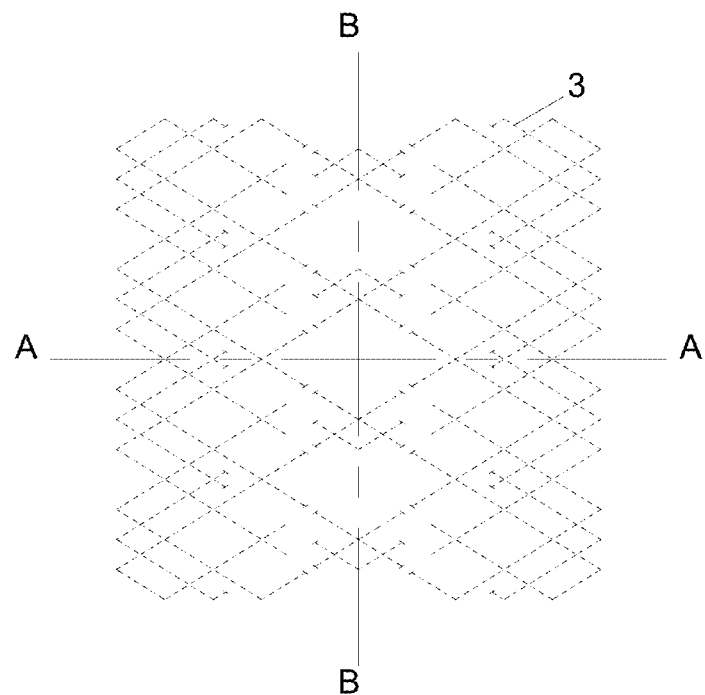
FIG. 8 illustrates a pattern for the dummy lines in the sensing layer of the metal mesh assembly according to the one embodiment of the present disclosure.

FIG. 8 illustrates a pattern for the dummy lines 3 in the sensing layer of the metal mesh assembly according to the above embodiments of the present disclosure. As shown in the figure, the pattern for the dummy lines 3 also has two symmetric axes that substantially overlap with the above mentioned first symmetric axis A-A and the second symmetric axis B-B, respectively. Such a configuration for the pattern for the dummy lines 3 allows the composite pattern unit to have a substantially complete symmetry.

It is noted that the pattern for the dummy lines 3, the pattern for the sensing lines 2, and the pattern for the driving lines 1 together form a composite pattern unit as described above. In the composite pattern unit, when the driving lines 1 and the sensing lines 2 both have definite patterns, the dummy lines 3 also has a definite pattern. The details of the pattern for the dummy lines 3 are skipped herein.

Figure 9:
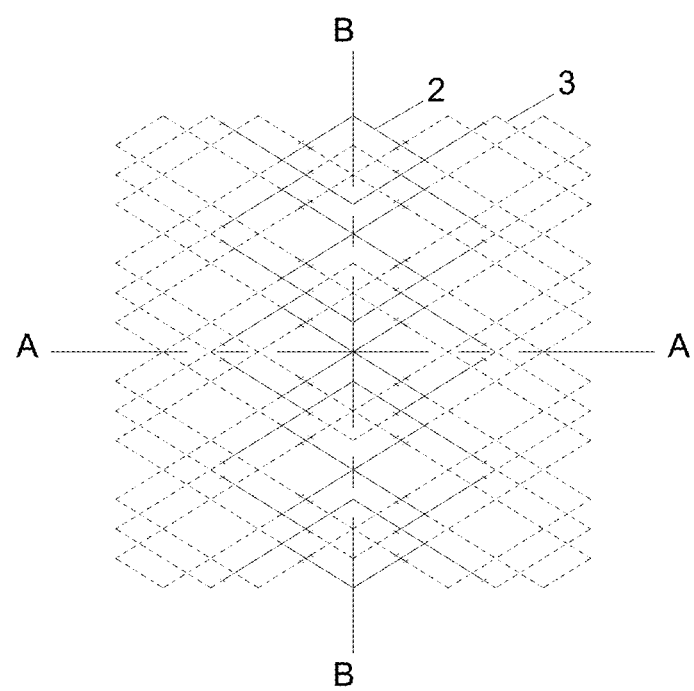
FIG. 9 illustrates a pattern for the sensing layer according to the one embodiment of the present disclosure.

As illustrated in FIG. 9, in the above mentioned embodiments of the metal mesh assembly, the sensing layer is provided with both sensing lines 2 and dummy lines 3. As such, a region in the sensing layer where the sensing lines 2 are arranged therein is a sensing region, whereas a region in the sensing layer where the dummy lines 3 are arranged therein is a dummy region. The patterns for each of the sensing region and the dummy region have a substantially complete symmetry.

Figure 10:
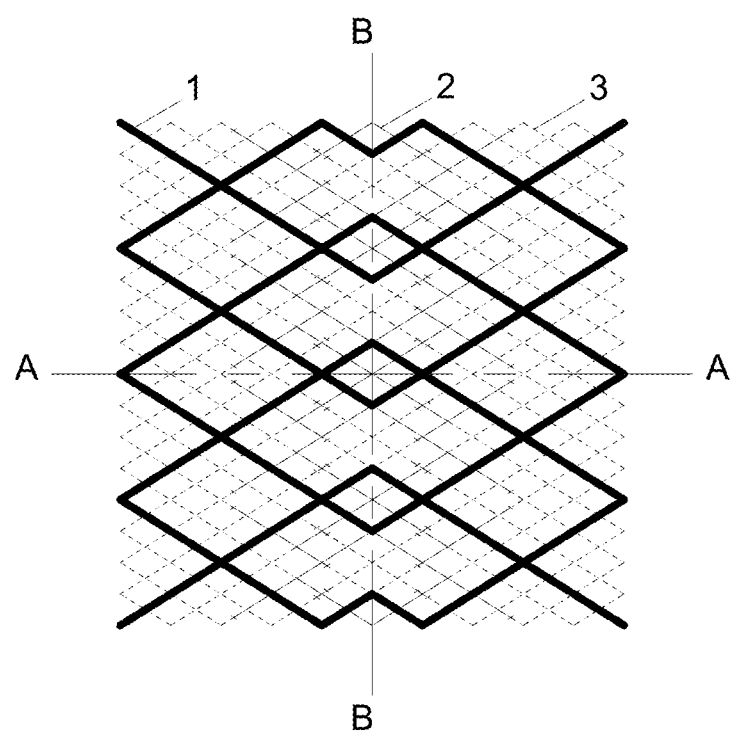
FIG. 10 illustrates a composite pattern unit according to the one embodiment of the present disclosure.

As illustrated in FIG. 10, in the above mentioned embodiments of the metal mesh assembly, the pattern for the driving lines 1 that is arranged in the driving layer, and the pattern for the sensing lines 2 and the pattern for the dummy lines 3 that are both arranged in the sensing layer together form a composite pattern unit. Herein, in order to clearly illustrate the configuration and layout for the various metal lines (i.e. the driving lines 1, the sensing lines 2, etc.), the diamond-shaped metal line frames are not filled with gray color.

FIGS. 11-16 illustrate a metal mesh assembly according to another embodiment of the disclosure. Similar to the above embodiment described above and illustrated in FIGS. 2-10, the embodiment to be described herein also has a similar main structure, and also comprise a plurality of composite pattern units that are formed by a plurality of metal lines. The detailed configuration for the another embodiment of the metal mesh assembly herein can reference to the description for the one embodiment of the metal mesh assembly described above, and the description that follows will focus primarily on the different features.

As shown in FIG. 11, each of the plurality of composite pattern units has a first symmetric axis A-A and a second symmetric axis B-B that are substantially perpendicular to each other. Each of the plurality of composite pattern units comprises a plurality of basic patterns, whose column number is an even number. More specifically, each of the plurality of composite pattern units includes 8 rows and 6 columns of basic patterns.

The structure of each of the plurality of basic patterns in each of the plurality of composite pattern units is similar to the one embodiment of the metal mesh assembly illustrated in FIGS. 2-10, and can specifically reference to FIG. 3. In this embodiment described herein, each of the plurality of basic patterns also comprises a metal frame having a diamond shape (i.e. diamond-shaped metal frame) and two metal segments crossing with each other. Each of the two metal segments is configured to run through a center point of the diamond-shaped metal mesh assembly and connecting the midpoints of two opposing sides of the diamond-shaped metal mesh.

Herein, the four sides of the diamond-shaped metal frame in each basic pattern are formed by dummy lines 3 only, and the two metal segments are formed by any two of the dummy lines 3, the sensing lines 2, and the driving lines 1.

In the following, the pattern for the driving lines 1, the pattern for the sensing lines 2, and the pattern for the dummy lines 3 in this embodiment of the metal mesh assembly are described in detail individually.

Figure 12:
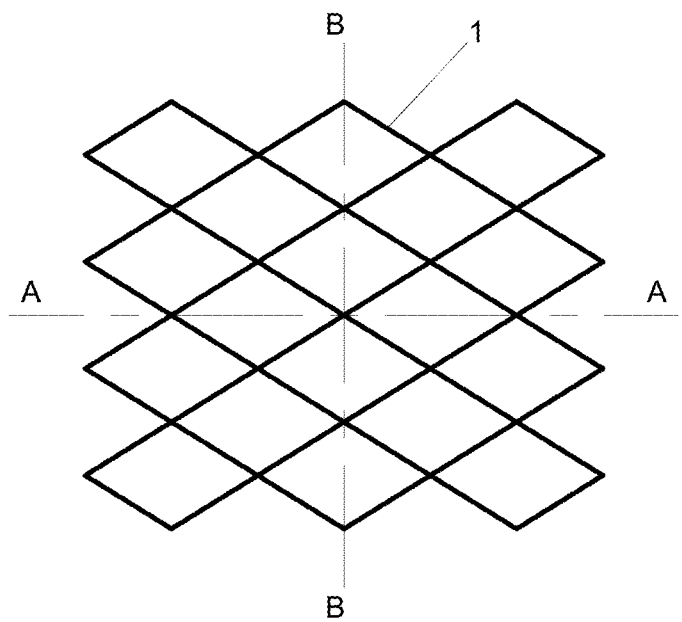
FIG. 12 illustrates a pattern for the driving lines in the metal mesh assembly according to the another embodiments of the disclosure.

FIG. 12 illustrates a pattern for the driving lines 1 in the metal mesh assembly according to the above embodiment of the present disclosure. As shown in the figure, the pattern for the driving lines 1, which are in the driving layer, has two symmetric axes that substantially overlap with the first symmetric axis A-A and the second symmetric axis B-B, respectively. Such a configuration for the pattern for the driving lines 1 allows the composite pattern unit to have a substantially complete symmetry.

As shown in FIG. 12, the pattern for the driving lines 1 in the driving layer comprises a plurality of diamond-shaped patterns (i.e. termed first diamond-shaped sub-patterns hereafter) arranged in a matrix. More specifically, the plurality of first diamond-shaped sub-patterns are sequentially connected along both the horizontal direction (i.e. the first symmetric axis A-A) and the vertical direction (i.e. the second symmetric axis B-B). The column number of the plurality of first diamond-shaped sub-patterns formed by driving lines 1 in the driving layer is an odd number. For example, there are three columns of first diamond-shaped sub-patterns specifically shown in FIG. 12. In other words, the second symmetric axis B-B runs through the first diamond-shaped sub-patterns in the middle column.

Figure 13:
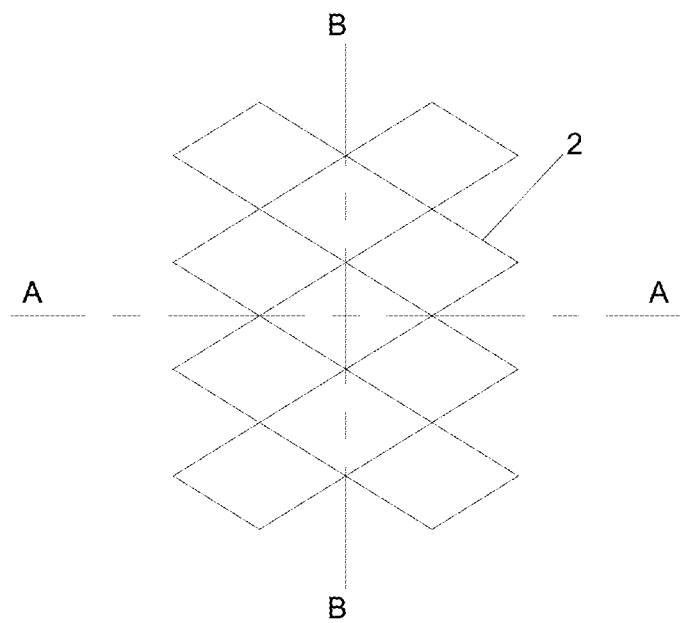
FIG. 13 illustrates a pattern for the sensing lines in the metal mesh assembly according to the another embodiments of the disclosure.

FIG. 13 illustrates a pattern for the sensing lines 2 in the sensing layer of the metal mesh assembly according to the above embodiments of the present disclosure. As shown in the figure, the pattern for the sensing lines 2 also has two symmetric axes that substantially overlap with the above mentioned first symmetric axis A-A and the second symmetric axis B-B, respectively. Such a configuration for the pattern for the sensing lines 2 allows the composite pattern unit to have a substantially complete symmetry.

As further illustrated in FIG. 13, the pattern for the sensing lines 2 in the sensing layer similarly also comprises a plurality of diamond-shaped patterns (i.e. termed "second diamond-shaped sub-patterns hereafter) arranged in a matrix. More specifically, the plurality of second diamond-shaped sub-patterns are sequentially connected along both the horizontal direction (i.e. the first symmetric axis A-A) and the vertical direction (i.e. the second symmetric axis B-B). The column number of the plurality of second diamond-shaped sub-patterns in the driving layer is an even number. For example, there are two columns of second diamond-shaped sub-patterns specifically shown in FIG. 13. In other words, the second symmetric axis B-B does not run through any second diamond-shaped sub-patterns.

Figure 14:
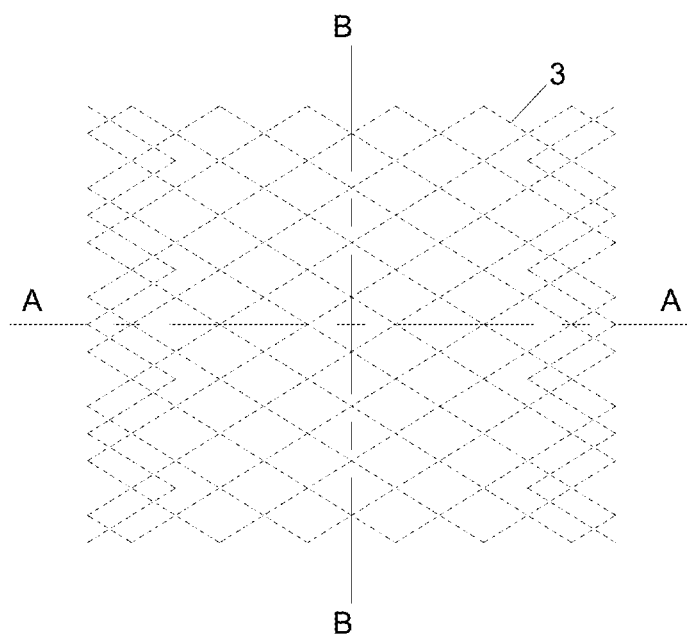
FIG. 14 illustrates a pattern for the dummy lines in the metal mesh assembly according to the another embodiments of the disclosure.

FIG. 14 illustrates a pattern for the dummy lines 3 in the sensing layer of the metal mesh assembly according to the above embodiments of the present disclosure. As shown in the figure, the pattern for the dummy lines 3 also has two symmetric axes that substantially overlap with the above mentioned first symmetric axis A-A and the second symmetric axis B-B, respectively. Such a configuration for the pattern for the dummy lines 3 allows the composite pattern unit to have a substantially complete symmetry.

Figure 15:
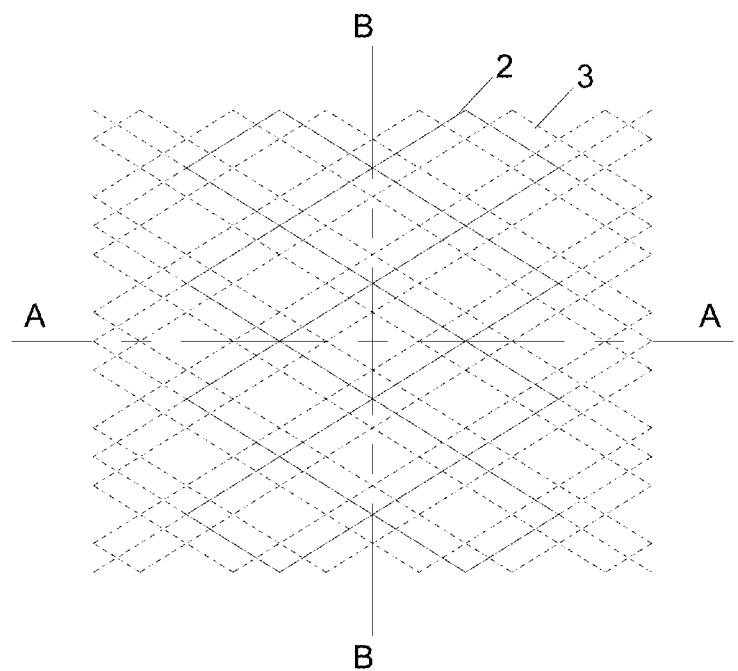
FIG. 15 illustrates a pattern for the sensing layer according to the another embodiment of the disclosure.

As illustrated in FIG. 15, in the embodiments of the metal mesh assembly described herein, the sensing layer is provided with both sensing lines 2 and dummy lines 3. As such, a region in the sensing layer where the sensing lines 2 are arranged therein is a sensing region, whereas a region in the sensing layer where the dummy lines 3 are arranged therein is a dummy region. The patterns for each of the sensing region and the dummy region have a substantially complete symmetry.

Figure 16:
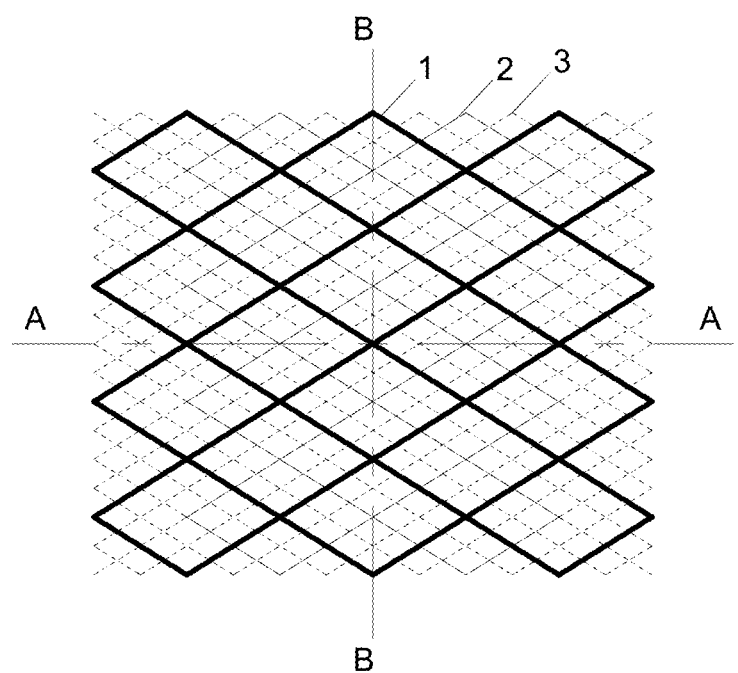
FIG. 16 illustrates a composite pattern unit according to the another embodiments of the disclosure.

FIG. 16 illustrates a composite pattern of the pattern for the driving lines 1 that is arranged in the driving layer, and the pattern for the sensing lines 2 and the pattern for the dummy lines 3 that are arranged in the sensing layer, which together form the composite pattern unit. In order to clearly illustrate the configuration and layout for the various metal lines (i.e. the driving lines 1, the sensing lines 2, etc.), the diamond-shaped metal line frames are not filled with gray color.

In a second aspect, the present disclosure further provides a touch control display panel.

The touch control display panel includes a substrate and a metal mesh assembly disposed over the substrate. Herein the metal mesh assembly can be any one of the embodiments of the metal mesh assembly as described above.

Specifically, in the touch control display panel described herein, a plurality of touch electrodes can be arranged over the substrate, and each of the plurality of touch electrodes can comprise a metal mesh assembly according to any one of the embodiments of the metal mesh assembly as described above.

Because the metal mesh assembly is completely symmetrical, the touch control display panel can support the use of an active pen with tilt function, and additionally have excellent electric effect. It is noted that the plurality of touch electrodes can be connected with each other via bridging so as to facilitate signal transmission.

Herein the touch control display panel can be an add-on touch control display panel or can be a built-in touch control display panel.

Figure 17:
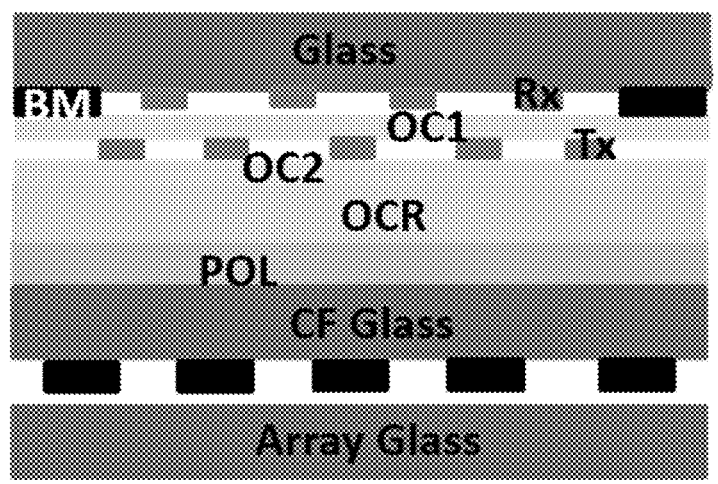
FIG. 17 illustrates a structural diagram of an add-on touch control display panel according to some embodiments of the present disclosure.

FIG. 17 illustrates a structure of an add-on touch control display panel according to some embodiments of the disclosure. As shown in FIG. 17, this add-on touch control display panel substantially comprises a display panel, a metal mesh assembly layer over the display panel, and a substrate over the metal mesh assembly layer, as shown in a bottom-to-top direction in the structural diagram of the add-on touch control display panel shown in FIG. 17.

The display panel can be based on a current technology known to people of ordinary skills in the field, and can, according to some embodiments of the touch control display panel shown in FIG. 17, comprise a base substrate, which can be a glass (shown as "array glass"). The display panel further comprises a liquid crystal layer, a color filter substrate (such as a color filter glass, shown as "CF glass"), a polarizing layer (POL), and an optically clear resin (OCR) layer, which are sequentially over the base substrate.

The metal mesh assembly layer that is over the display panel comprises a sensing layer (shown as Rx), a driving layer (shown as Tx), a first protection layer (shown as OC1) and a second protection layer (shown as OC2), which are sequentially arranged between the substrate and the display panel and in a direction from the substrate to the display panel (i.e. top-to-bottom direction in FIG. 17). As such, in the embodiment of the add-on touch control display panel, the first protection layer is between the sensing layer and the driving layer, and the second protection layer (shown as OC2) is between the driving layer and the display panel.

Herein, the driving layer can comprise a pattern for the driving lines according to any one of the embodiments as described above. The sensing layer can comprise a pattern for the sensing lines. The dummy lines can be arranged only in the sensing layer, only in the driving layer, or partly in the sensing layer and partly in the driving layer.

The add-on touch control display panel further comprises a black matrix layer (shown as BM in the figure), which is arranged to be at a substantially same layer as the sensing layer in the embodiment of the add-on touch control display panel shown in FIG. 17. It is noted that the black matrix layer can optionally be arranged at a different layer as the sensing layer.

Figure 18:
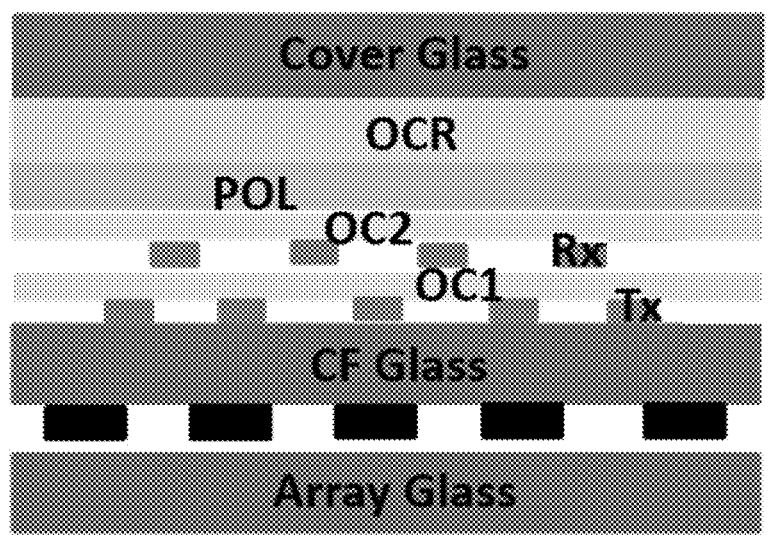
FIG. 18 illustrates a structural diagram of a built-in touch control display panel according to some embodiments of the present disclosure.

FIG. 18 illustrates a structure of a built-in touch control display panel according to some embodiments of the disclosure. As shown in FIG. 18, this built-in touch control display panel comprises a display panel, which comprises a base substrate (e.g. "array glass"), a liquid crystal layer, a color filter substrate (such as a color filter glass, shown as "CF glass"), a polarizing layer (POL), and an optically clear resin (OCR) layer, and a cover substrate (e.g. cover glass), which are sequentially arranged in a bottom-to-top direction in the figure.

The built-in touch control display panel further comprises a metal mesh assembly layer between the color filter substrate and the POL of the display panel. Specifically, the metal mesh assembly layer comprises a driving layer (shown as Tx), a first protection layer (shown as OC1), a sensing layer (shown as Rx), and a second protection layer (shown as OC2), which are sequentially arranged over the color filter substrate and below the POL of the display panel, as shown in the bottom-to-top direction in FIG. 18.

Similar to the add-on touch control display panel, in the built-in touch control display panel, the driving layer can comprise a pattern for the driving lines according to any one of the embodiments as described above; the sensing layer can comprise a pattern for the sensing lines; and the dummy lines can be arranged only in the sensing layer, only in the driving layer, or partly in the sensing layer and partly in the driving layer.

It is noted that in both the embodiment of the add-on touch control display panel shown in FIG. 17 and the embodiment of the built-in touch control display panel shown in FIG. 18, a top surface (as indicated by the arrows in both figures) serves as a touch surface of the touch control display panel, and the sensing layer is preferably arranged to be relatively closer to the touch surface than the driving layer.

However, this above configuration shall not be interpreted as a limitation to the invention disclosed herein, and optionally the driving layer can be arranged to be relatively closer to the touch surface of the touch control display panel than the sensing layer.

In a third aspect, the present disclosure further provides a method for manufacturing a touch control display panel. The touch control display panel can be based on any one of the embodiments described above.

Figure 19:
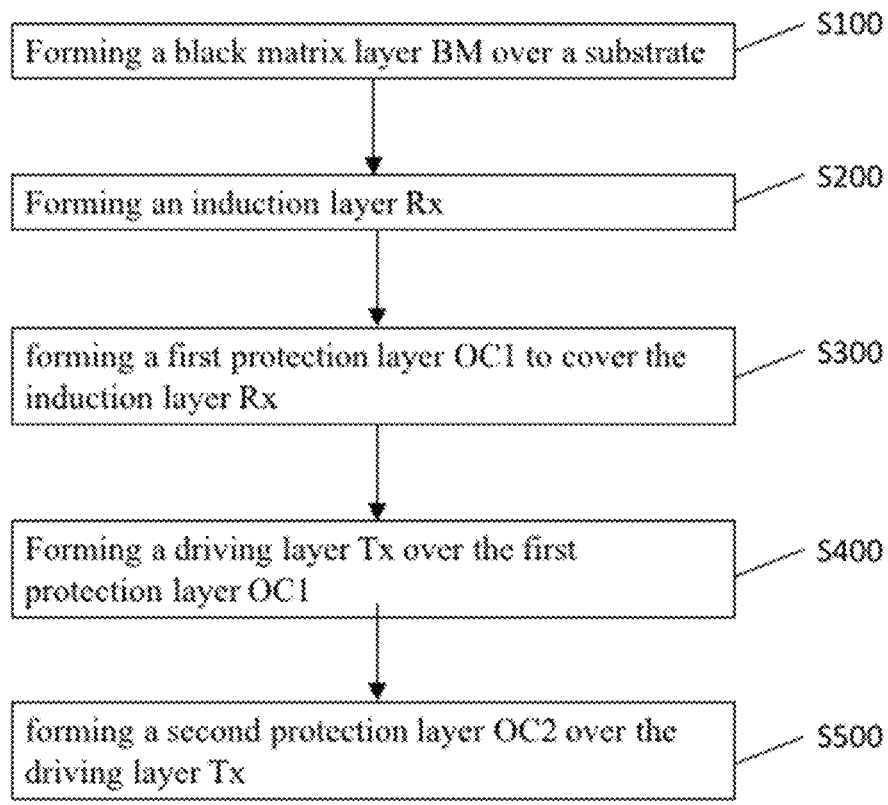
FIG. 19 is a flow chart of manufacturing the touch control display panel shown in FIG. 17.

According to some embodiments, the touch control display panel is an add-on touch control display panel illustrated in FIG. 17. As such, as illustrated in FIG. 19, the manufacturing method comprises the following steps:

S100: forming a black matrix layer BM over a substrate.

This step can primarily include processes such as coating, exposing and developing, to thereby form a pattern of the black matrix layer BM.

S200: forming a sensing layer Rx;

This step can include processes including: depositing a metal film layer, coating a photoresist, exposing and developing, to thereby form the metallic pattern in the sensing layer Rx.

S300: forming a first protection layer OC1 to cover the sensing layer Rx;

This step can primarily include processes such as coating, exposing and developing, to thereby form the first protection layer OC1 for the protection of the electrodes in the sensing layer Rx.

S400: forming a driving layer Tx over the first protection layer OC1;

This step can include processes including: depositing a metal film layer, coating a photoresist, exposing and developing, to thereby form the metallic pattern in the driving layer Tx.

S500: forming a second protection layer OC2 over the driving layer Tx.

This step can primarily include processes such as coating, exposing and developing, to thereby form the second protection layer OC2 for the protection of the electrodes in the driving layer Tx.

In at least some of the above steps (i.e. S100-S500), a mask that is specifically designed for the step(s) can be used for the formation of relevant layers.

Figure 20:
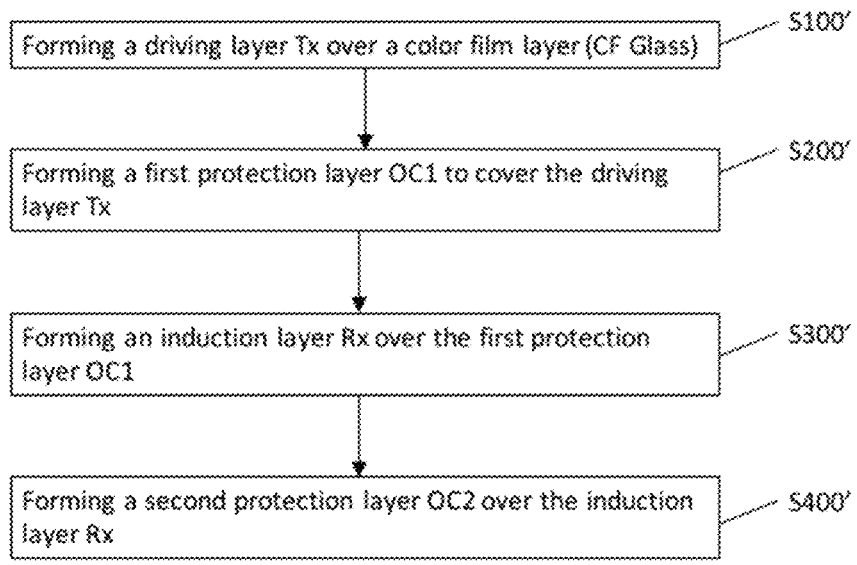
FIG. 20 is a flow chart of manufacturing the touch control display panel shown in FIG. 18.

According to some other embodiments, the touch control display panel is a built-in touch control display panel illustrated in FIG. 18. As such, as illustrated in FIG. 20, the manufacturing method comprises the following steps:

S100': forming a driving layer Tx over a color film layer (CF Glass).

This step can include processes including: depositing a metal film layer, coating a photoresist, exposing and developing, to thereby form the metallic pattern in the driving layer Tx.

S200': forming a first protection layer OC1 to cover the driving layer Tx.

This step can primarily include processes such as coating, exposing and developing, to thereby form the first protection layer OC1 for the protection of the electrodes in the driving layer Tx.

S300': forming a sensing layer Rx over the first protection layer OC1;

This step can include processes including: depositing a metal film layer, coating a photoresist, exposing, and developing, to thereby form the metallic pattern in the sensing layer Rx.

S400': forming a second protection layer OC2 over the sensing layer Rx.

This step can primarily include processes such as coating, exposing and developing, to thereby form the second protection layer OC2 for the protection of the electrodes in the sensing layer Rx.

In at least some of the above steps (i.e. S100'-S400'), a mask that is specifically designed for the step(s) can be used for the formation of relevant layers.

In a fourth aspect, the present disclosure further provides a display apparatus. The display panel comprises a touch control display panel according to any one of the embodiments as described above.

All references cited in the present disclosure are incorporated by reference in their entirety. Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A metal mesh assembly, comprising a plurality of composite pattern units, each formed by a plurality of metal lines and having two substantially perpendicular symmetric axes, wherein the plurality of metal lines comprise:
   a plurality of driving lines, in a driving layer; and
   a plurality of sensing lines, in a sensing layer insulated from the driving layer;
   wherein:
      the plurality of driving lines and the plurality of sensing lines compositely form each of the plurality of composite pattern units;
      each of the plurality of driving lines and the plurality of sensing lines have a pattern with the two substantially perpendicular symmetric axes;
      the plurality of metal lines further comprise a plurality of dummy lines, arranged in at least one of a dummy layer, the driving layer and the sensing layer;

the plurality of dummy lines, along with the plurality of driving lines and the plurality of sensing lines, compositely form each of the plurality of composite pattern units;

the plurality of dummy lines have a pattern with the two substantially perpendicular symmetric axes; and each of the plurality of composite pattern units comprises a plurality of basic patterns, wherein each of the plurality of basic patterns is within a rectangular region and comprises:

a metal frame having a diamond shape; and two metal segments crossing with each other, each through a center of the diamond shape, and through two midpoints of two opposing sides of the diamond shape; wherein:

four corner points of the diamond shape are respectively at four midpoints of four sides of the rectangular region; and the two metal segments are respectively two cross lines of the rectangular region.

2. The metal mesh assembly of claim 1, wherein at least some of the plurality of dummy lines are in the sensing layer, wherein:

each of the at least some of the plurality of dummy lines is severed from any of the plurality of sensing lines crossing therewith.

3. The metal mesh assembly of claim 1, wherein the plurality of basic patterns are arranged in a matrix having an odd number of columns, wherein in each of the plurality of basic patterns:

the metal frame is formed by a type of dummy lines, or by the type of dummy lines and a type of sensing lines compositely; and the two metal segments are formed by at least two of the type of dummy lines, the type of sensing lines, and a type of driving lines.

4. The metal mesh assembly of claim 3, wherein a metal pattern in the sensing layer in the each of plurality of composite pattern units is separated into four sub-sensing regions by the two substantially perpendicular symmetric axes, wherein:

each of the four sub-sensing comprises a plurality of first composite patterns, sequentially connected one after another along one of the two substantially perpendicular symmetric axes.

5. The metal mesh assembly of claim 4, wherein each of the plurality first composite patterns comprises a y-shaped portion and a X-shaped portion, wherein an upper end part of the X-shaped portion connects a lower end part of the y-shaped portion.

6. The metal mesh assembly of claim 3, wherein a metal pattern in the driving layer in the each of plurality of composite pattern units is separated into four sub-driving regions by the two substantially perpendicular symmetric axes, wherein:

each of the four sub-driving comprises a plurality of second composite patterns, sequentially connected one after another along one of the two substantially perpendicular symmetric axes.

7. The metal mesh assembly of claim 6, wherein each of the plurality of second composite patterns comprises:

an x-shaped portion having two crossing segments; and two bent portions at a side of the x-shaped portion closer to the one of the two substantially perpendicular symmetric axes and connecting the two crossing segments respectively, wherein the two bent portions are parallel to the two crossing segments respectively.

8. The metal mesh assembly of claim 1, wherein the plurality of basic patterns are arranged in a matrix having an even number of columns, wherein in each of the plurality of basic patterns:

the metal frame is formed by a type of dummy lines; and the two metal segments are formed by any two of the type of dummy lines, the type of sensing lines, and a type of driving lines.

9. The metal mesh assembly of claim 8, wherein a pattern for the plurality of driving lines in the each of plurality of composite pattern units comprises a plurality of first diamond-shaped sub-patterns arranged in a matrix and sequentially connected one another along each of the two substantially perpendicular symmetric axes, wherein:

a column number of the plurality of first diamond-shaped sub-patterns is an odd number.

10. The metal mesh assembly of claim 8, wherein a pattern for the plurality of sensing lines in the each of plurality of composite pattern units comprises a plurality of second diamond-shaped sub-patterns arranged in a matrix and sequentially connected one another along each of the two substantially perpendicular symmetric axes, wherein:

a column number of the plurality of second diamond-shaped sub-patterns is an even number.

11. The metal mesh assembly of claim 1, further comprising a first protection layer between, and configured to provide insulation between, the driving layer and the sensing layer.

12. A touch control display panel, comprising a metal mesh assembly according to claim 1.

13. The touch control display panel according to claim 12, wherein the metal mesh assembly is arranged such that the sensing layer is closer to a touch side of the touch control display panel than the driving layer.

14. The touch control display panel according to claim 13, further comprising a display panel, wherein the metal mesh assembly is between the display panel and the touch side of the touch control display panel.

15. The touch control display panel according to claim 14, further comprising a black matrix layer, wherein the black matrix layer is at a substantially same layer as the sensing layer of the metal mesh assembly.

16. The touch control display panel according to claim 15, wherein the metal mesh assembly further comprises a second protection layer, between the driving layer and the display panel.

17. The touch control display panel according to claim 13, further comprising a display panel, wherein the metal mesh is between a color filter substrate and a POL layer of the display panel.

18. The touch control display panel according to claim 17, wherein the metal mesh assembly further comprises a second protection layer, between the sensing layer and the POL layer of the display panel.

* * * * *